United States Patent [19]

Beiswenger et al.

[11] 4,349,157
[45] Sep. 14, 1982

[54] HOSE-END SPRAYER

[75] Inventors: John L. Beiswenger, Salem, Wis.; Frank A. Smiesko, McHenry, Ill.

[73] Assignee: Acme Burgess, Inc., Grayslake, Ill.

[21] Appl. No.: 215,834

[22] Filed: Jan. 30, 1981

[51] Int. Cl.³ .............................................. B05B 1/26
[52] U.S. Cl. .................................... 239/509; 239/318
[58] Field of Search ................ 239/310, 312, 315–318, 239/390, 391, 396, 397, 505, 507, 509–511, 513, 516–519, 521, 523

[56] References Cited

U.S. PATENT DOCUMENTS

| | | | |
|---|---|---|---|
| 617,472 | 1/1899 | Neumeyer et al. | 239/509 |
| 2,676,062 | 4/1954 | Hamilton | 239/509 |
| 2,801,882 | 8/1957 | Schwemlein | 239/513 X |
| 3,204,875 | 9/1965 | Lagstroth | 239/318 |
| 3,254,844 | 6/1966 | Blasnik et al. | 239/318 |
| 3,381,899 | 5/1968 | Forsman | 239/507 X |

FOREIGN PATENT DOCUMENTS 484592  7/1972  Canada ................................ 239/510

Primary Examiner—Johnny D. Cherry
Attorney, Agent, or Firm—Howard H. Darbo

[57] ABSTRACT

The sprayer comprises two main functioning units; namely, a flow control system incorporated in the chemical concentrate jar top closure and a spray nozzle integral with the closure for dispensing dilute solutions of fertilizer, pesticides and the like as supplied by the flow control system. The control system comprises an ejector for drawing concentrate from the reservoir jar and a pair of coaxial, independently rotatable valve elements, one, acting with fixed structure, serving to turn the water supply off or direct the water into the chemical concentrate jar or through the unit to the spray nozzle, the other, operating in conjunction with the first valve element, controlling by means of flow resistance in a labyrinth, desirably in conjunction with an orifice metering disc, proportionate feed from the jar of chemical concentrate to the main water stream. Proportionate feed may be accomplished without the flow resistance control by appropriate dimensioning of the ejector. The ejector is itself novel in that it is made of plastic material by injection with a single mold having a single core forming the entire length of the ejector passageway. The spray nozzle includes an adjustable, cam-controlled baffle for selectively achieving a downwardly or upwardly directed spread spray pattern or a jet stream.

8 Claims, 21 Drawing Figures

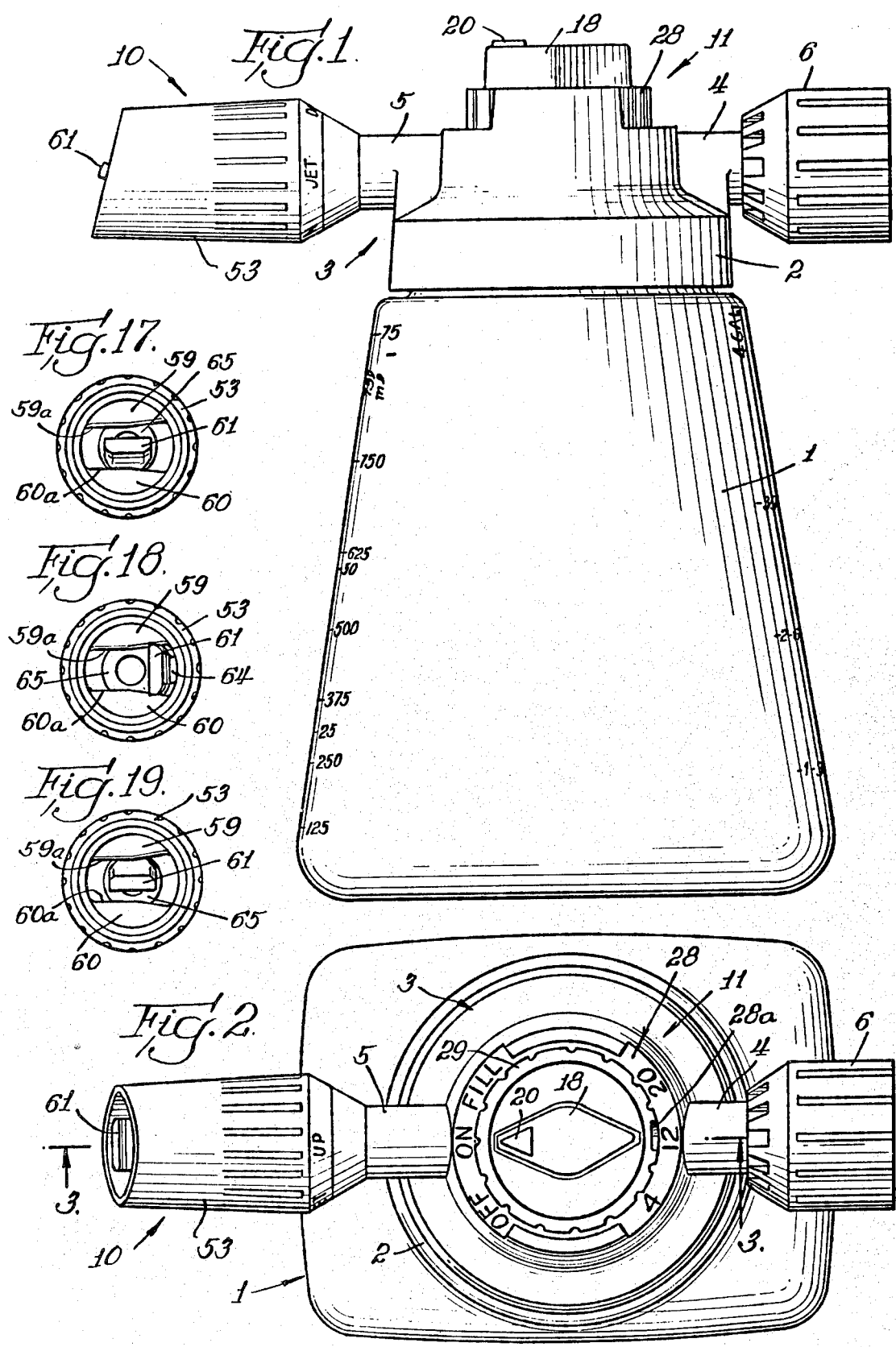

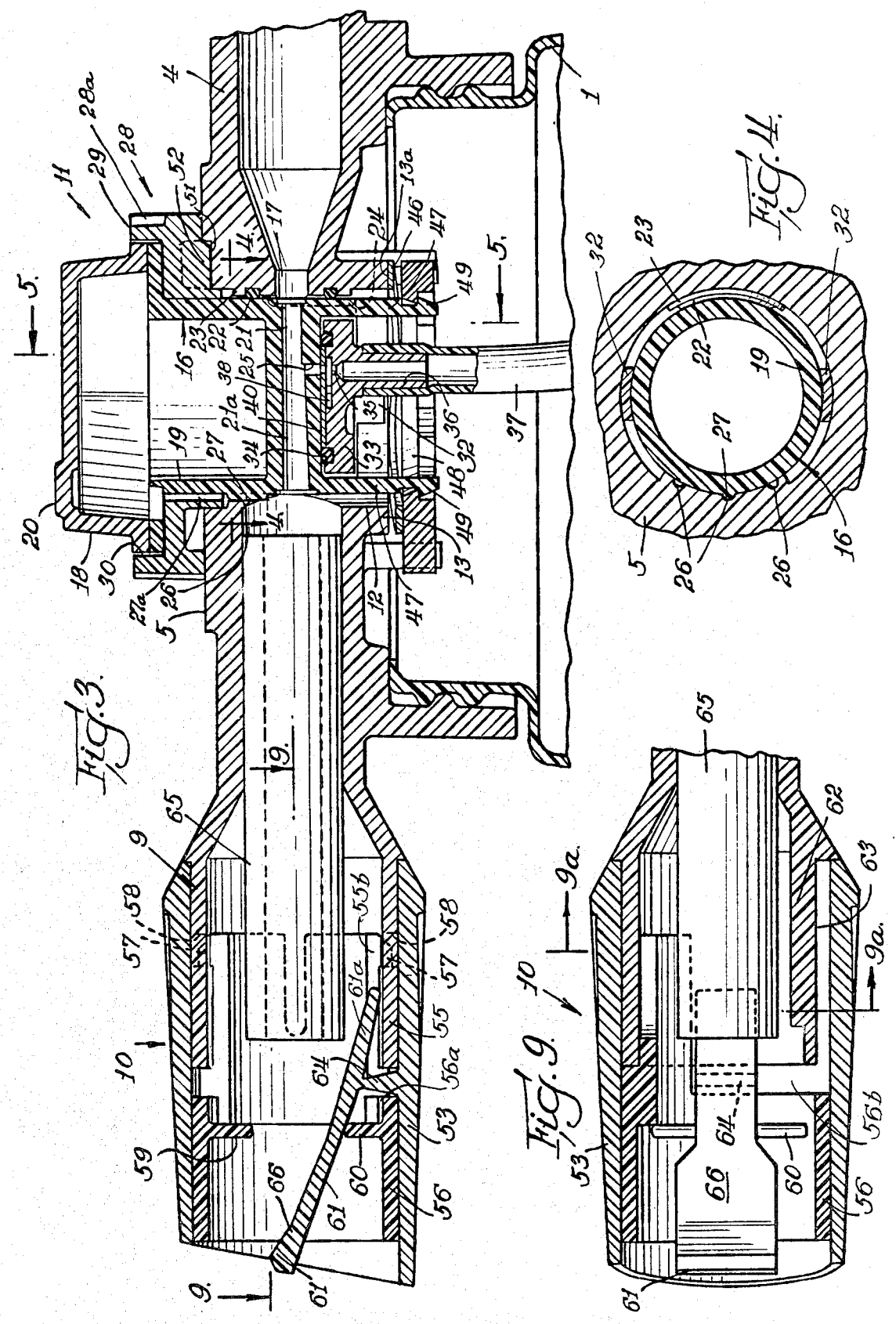

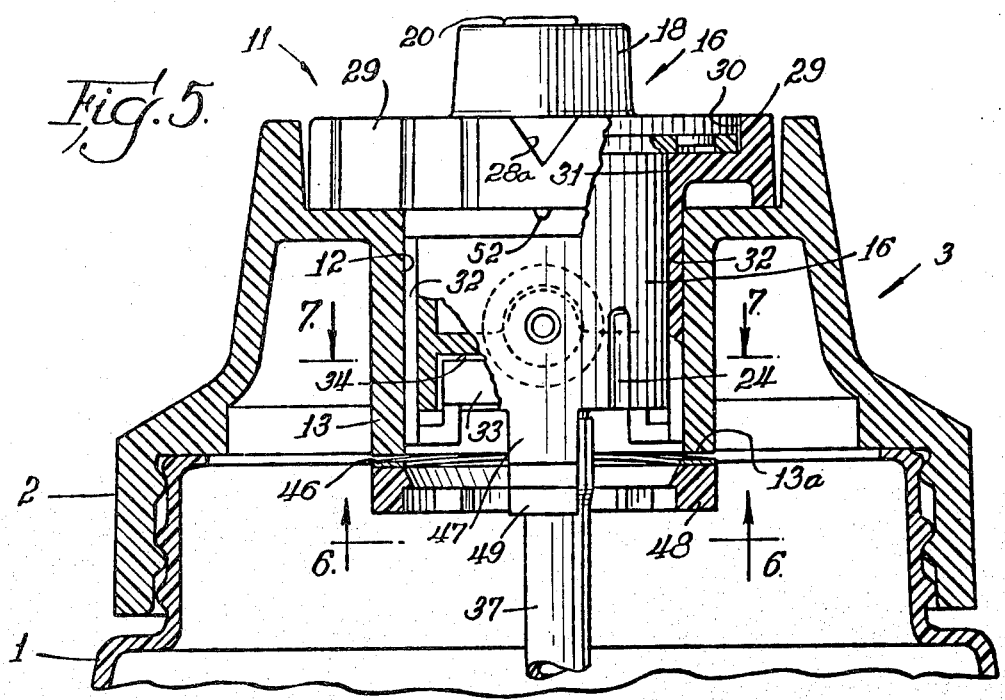
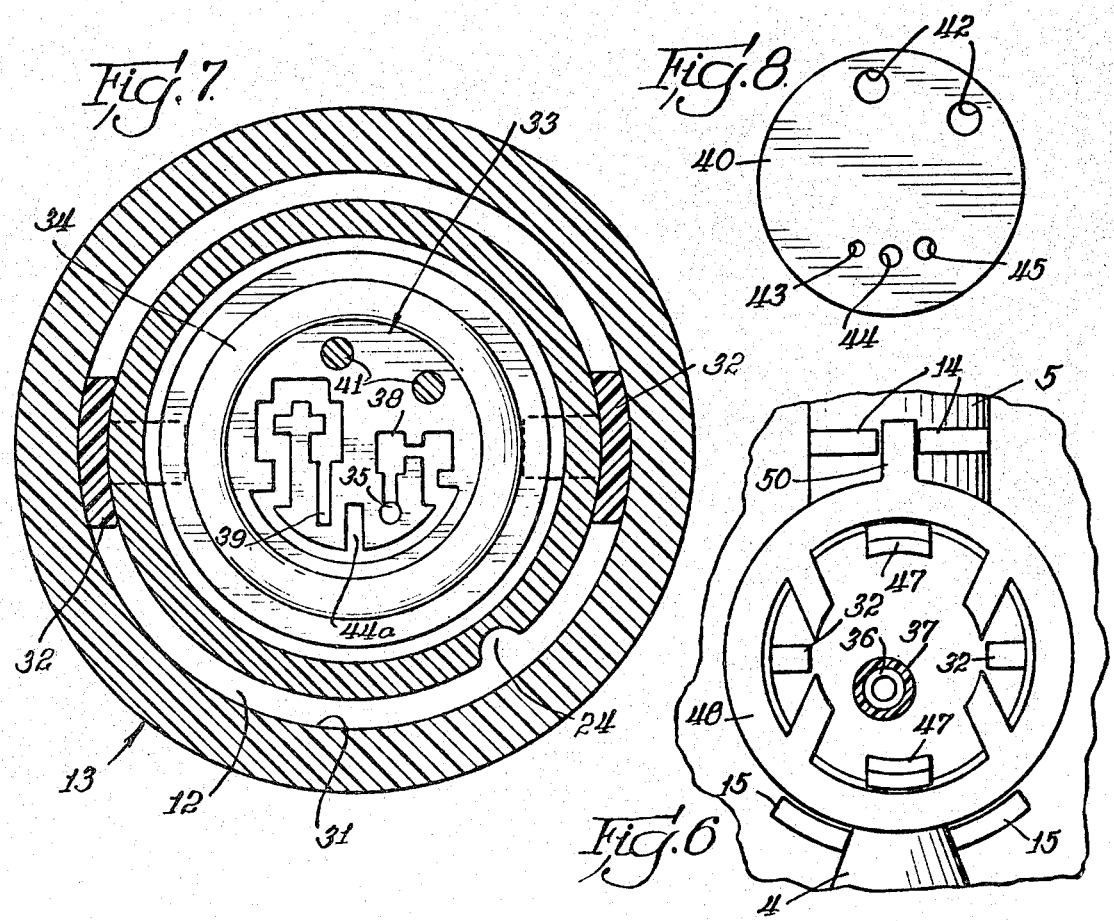

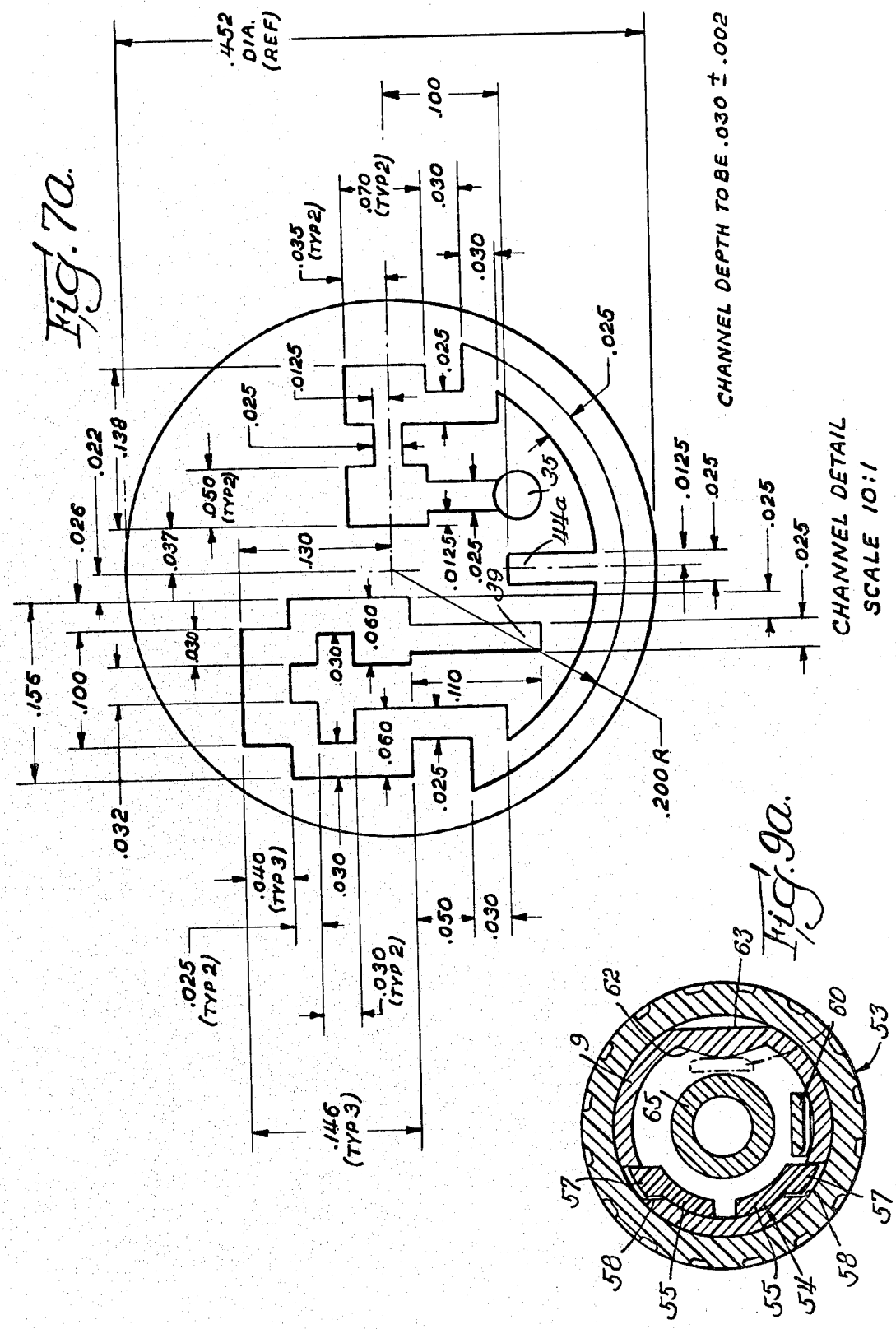

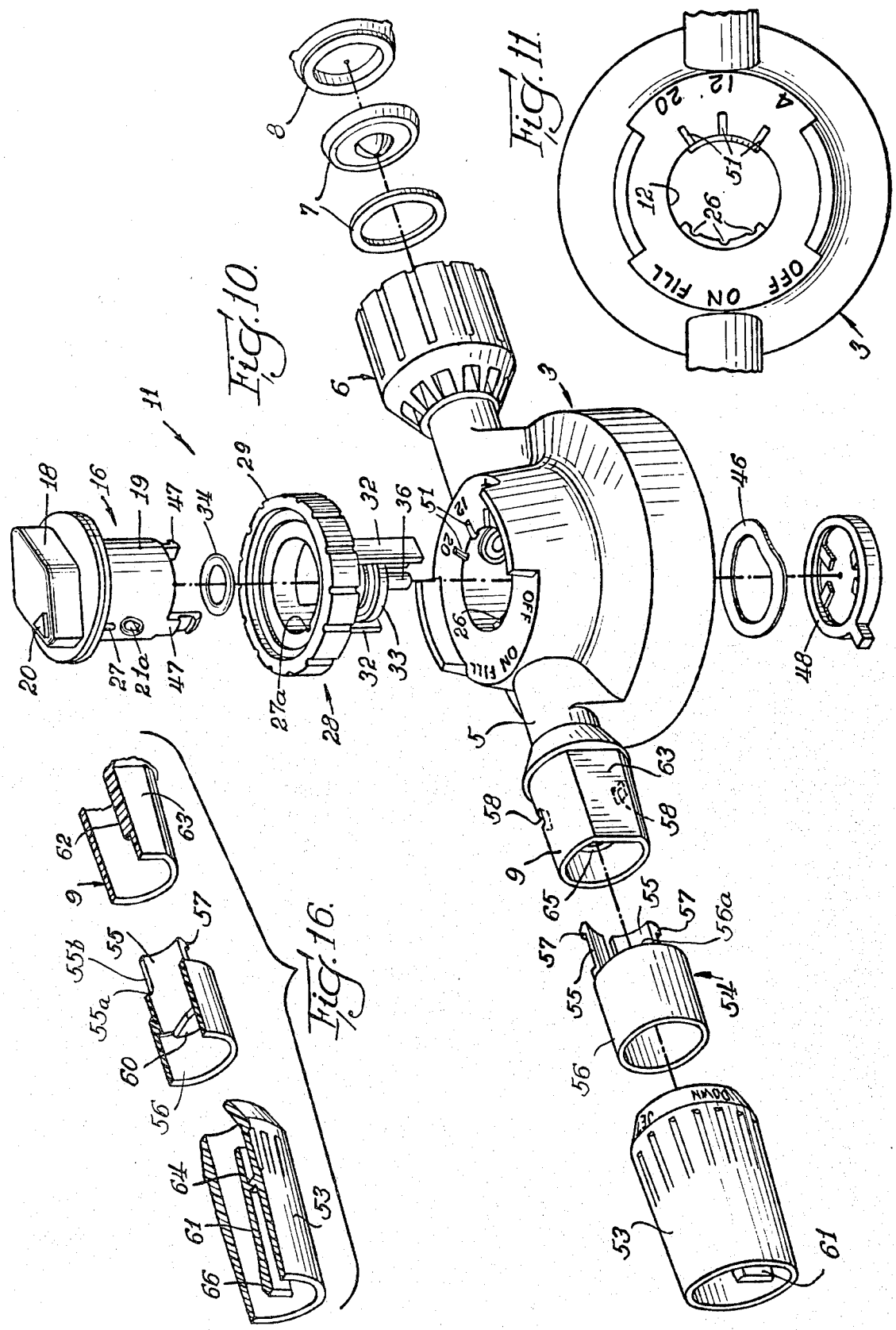

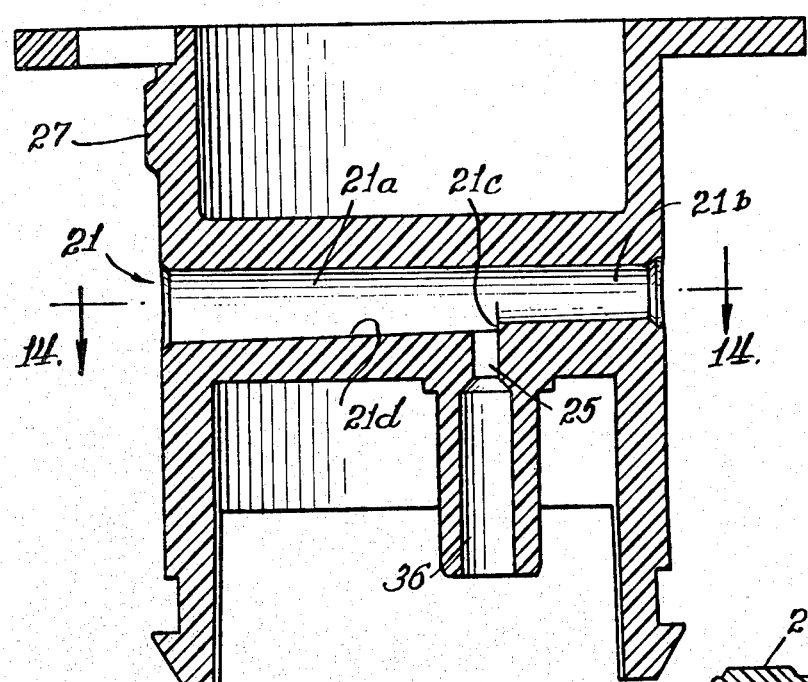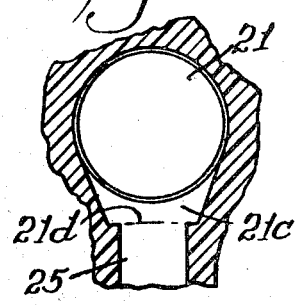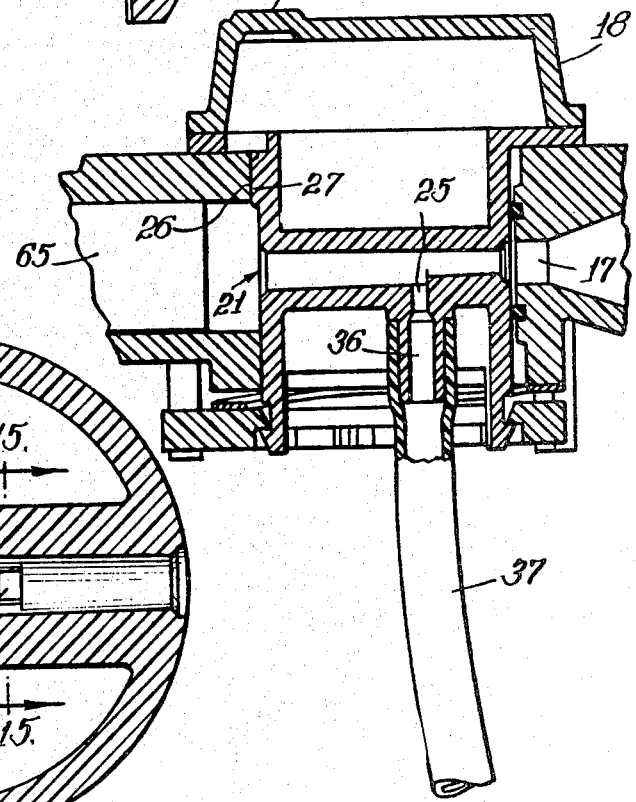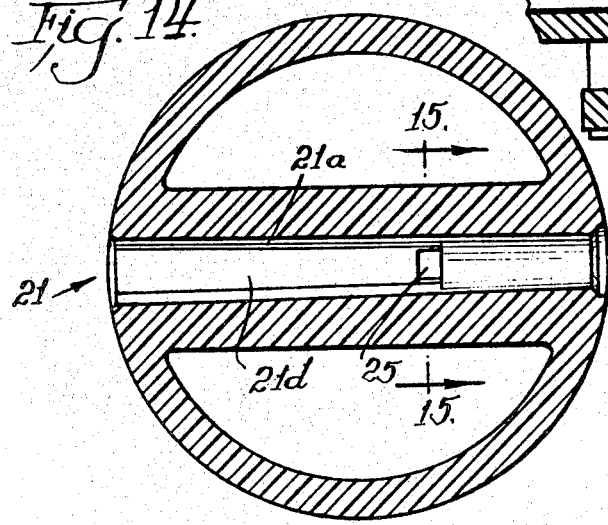

HOSE-END SPRAYER

BACKGROUND AND SUMMARY OF THE INVENTION

Many different forms of equipment have been used for dispensing dilute aqueous solutions of plant fertilizers, herbicides, pesticides and the like. One system in common use is the so-called hose-end sprayer which screws onto the end of, for example, a garden hose. The coupling and sprayer device are commonly integral with the closure for a jar which is provided to supply the active material in the form of liquid concentrate or soluble solid in cake or granular form. The apparatus includes means for gradually dissolving the solid material as the carrier stream of water flows to the sprayer head and means for continuously feeding a small amount of liquid concentrate to the main stream of water to be mixed therewith and dispensed by the sprayer. These hose-end sprayers have offered little flexibility in functioning characteristics, usually providing a particular mixing ratio with limited adjustment of spray stream characteristics.

The overall object of the present invention is to provide a plastic hose-end sprayer having a flow control system including, (1), a valve for selectively turning off the flow of water from the garden hose into the sprayer, directing incoming water into the mixing container for replenishing the concentrate or directing the stream of water through the sprayer for normal operation and, (2), metering apparatus to supply a particular, or any one of three, frequently used mixing ratios of carrier water to concentrate. The hose-end sprayer unit also includes an adjustable spray nozzle which receives the dilute aqueous solution and provides any one of three spraying patterns, one upward, one downward and one as a jet stream for more localized application.

More specifically, the invention herein shown and described in detail, in addition to providing the convenience of turning the water from a garden hose off or on at the sprayer or deflect a stream downwardly into the concentrate reservoir, the control system includes an ejector dimensioned to draw liquid concentrate from a reservoir jar at a predetermined rate and, if desired, a three-way valve externally operable to select the rate of flow of concentrate from the reservoir to the main carrier stream of water through the sprayer. The selective flow rate feature includes the provision in the flow control system of a metering system which includes a labyrinth of passageways having differing flow resistances one of which may be selected to provide the desired flow of concentrate liquid. Further control may be provided by apertures of predetermined size one of which is disposed at the outlet of each of the labyrinth passageways.

A further object is to provide a spray pattern and direction baffle within the sprayer barrel and integral therewith for controlling the nature and direction of projection of the spray pattern as the position of the baffle is controlled by a cam manually manipulated by rotating the sprayer barrel.

While the sprayer is described in its entirey herein, only the spray nozzle and associated structure is claimed, the flow control and associated structure being the particular subject of application Ser. No. 215,833, filed Dec. 12, 1980.

DESCRIPTION OF THE DRAWINGS

In the accompanying drawings,

FIG. 1 is a side elevational view of the hose-end sprayer of this invention;

FIG. 2 is a top view of the sprayer;

FIG. 3 is a cross-sectional view taken at the line 3—3 of FIG. 2;

FIG. 4 is a detail view in cross section taken at the line 4—4 of FIG. 3;

FIG. 5 is a cross-sectional view taken at the line 5—5 of FIG. 3;

FIG. 6 is a detail view taken at the line 6—6 of FIG. 5;

FIG. 7 is a detail view, partly in cross section, taken at the line 7—7 of FIG. 5;

FIG. 7a is a dimensioned plan of the metering flow channel labyrinth shown in FIG. 7;

FIG. 8 is a plan view of the apertured metering disc of the flow control system;

FIG. 9 is a cross-sectional view of the spray nozzle taken at the line 9—9 of FIG. 3;

FIG. 9a is a cross-sectional view taken at the line 9a—9a of FIG. 9;

FIG. 10 is an exploded view showing the relationship of the several component parts of the flow control system and the spray nozzle;

FIG. 11 is a top view of the integral sprayer body and jar closure showing the indexing detents for the flow control elements;

FIG. 12 is a cross-sectional view, similar and comparable to that of FIG. 3 but showing the mechanism of a sprayer providing a predetermined, fixed proportionate feed of concentrate solution;

FIG. 13 is a cross-sectional view of the unitary rotary valve element of the sprayer of FIG. 12 which incorporates and defines the injector employed in both embodiments of the invention described herein;

FIG. 14 is a cross-sectional view taken at line 14—14 of FIG. 13;

FIG. 15 is a cross-sectional detail view taken at the line 15—15 of FIG. 14;

FIG. 16 is an exploded view, in cross section, of the spray nozzle, and

FIGS. 17, 18 and 19 are front views looking into the spray nozzle and showing the position of the baffle for directing the spray pattern upwardly, jet-forwardly and downwardly respectively.

DESCRIPTION OF EXAMPLE EMBODYING BEST MODE OF THE INVENTION

The sprayer of this invention comprises a concentrate reservoir jar 1 and a closure 2 therefor which is an integral part of the body 3 of the sprayer. Preferably molded from a suitable plastic material as an integral unit, the body includes an inlet snout 4, an outlet snout 5 and stops and supporting structure for the other parts of the sprayer as hereinafter described. An inlet coupling 6 contains means, not shown, for rotatably securing the coupling to inlet snout 4 and conventional check valve 7 and gasket washer 8.

Outlet snout 5 terminates in a hub 9 which provides support for the spray nozzle head 10.

The flow control assembly 11 is mounted in and upon sprayer body 3. A cylindrical opening 12 is provided coaxially with the housing/jar closure unit. This opening is defined by depending cylindrical skirt 13. Stop elements 14 and 15 (FIG. 6), also molded integrally with the sprayer body 3, extend downwardly beyond the bottom of cylindrical skirt 13 for partially supporting the flow control assembly.

Cylindical rotary valve 16 is the primary control of the flow of water entering the sprayer through inlet snout 4 which terminates with inlet aperture 17. Valve 16 is composed of two parts permanently fastened together, indicating head and knob 18 and cylindrical body 19. As best shown in FIG. 10, the knob 18 includes an arrowhead 20 which is molded integrally with the top of the rotary valve for purposes hereinafter described. The body 19 of the rotary valve has a passageway 21 molded diametrically therethrough and defining an ejector (described in detail hereinafter) located to receive water from aperture 17. The passageway at this location is sealed against unintended lateral escape of water by an O-ring 22 which is seated between spaced concentric rings 23 molded integrally with body 3 of the sprayer. Passageway 21 opens at its outlet end into outlet snout 5.

As is seen in the plan view of the sprayer, FIG. 2, three positions of handle 18 are indicated, "OFF," "ON" and "FILL." In the position shown, the arrow indicator 20 is pointing to "ON", indicating the position in which the water is flowing through the sprayer and the sprayer is operating. This position is also shown in FIG. 3. By rotating knob 18 counterclockwise to point to "OFF," the connection of inlet aperture 17 with passageway 21 is broken and inlet snout 4 terminates with the blank cylindrical wall of rotary valve body 19. In this position, the flow of water from the supply hose is entirely stopped.

To supply water to the concentrate jar 1 for the purpose of refilling the same, the rotary valve is turned clockwise by means of knob 18 to the "FILL" position. At this position, fill groove 24, formed vertically on the surface of cylindrical body 19 circumferentially spaced from the inlet end of passageway 21 and closed at its top and open at its bottom end is connected with inlet aperture 17 to divert a limited flow of inlet water downwardly into jar 1 to dilute or dissolve the concentrated chemical material previously placed in the jar. When the jar has been filled, the rotary valve is placed to either the "OFF" or the "ON" position, thus discontinuing the flow into the fill groove and the concentrate reservoir.

A set of three detent grooves 26 (FIG. 11) are molded integrally with sprayer body 3 to cooperate with a small vertical stop 27 in the outer surface of cylindrical body 19 of the rotary valve to position and retain the valve in one of the three intended positions. To facilitate the proper relative orientation of the respective parts in assembling control assembly 11, a groove 27a is provided on the inner surface of valve 28 (see FIG. 3).

When the rotary valve is in the "ON" position, connection is made between the inlet end of passageway 21 and water inlet aperture 17, as shown in FIG. 3, so that the stream of water flows through the passageway to operate the sprayer. In accordance with the invention, passageway 21 defines an ejector, a jet pump for withdrawing liquid chemical concentrate from jar 1 and feeding the concentrate in predetermined proportion to the stream of water passing through the passageway. An aperture 25 molded in the wall of passageway 21 opens into snout 36 to which plastic tubing 37 is connected to connect with the liquid concentrate.

The design details of the ejector are shown in FIGS. 12–15. This novel configuration makes it possible to mold the ejector passageway by means of a single core in a one-part mold which forms the entire rotary valve body 19. Passageway inlet portion 21b is cylindrical (except for 0.25° molding draft) and terminates at a step 21c and opens into outlet portion 21a. As is best seen in FIGS. 14 and 15, outlet portion 21a has a flat floor 21d which intersects the bottom of step 21c. An aperture 25, rectangular in cross section, extends crosswise (FIGS. 13 and 14) immediately downstream from step 21c.

As is evident from FIGS. 12–15, the cross-sectional area of the inlet end of outlet portion 21a of the ejector is greater than the cross-sectional area of the outlet end of inlet portion 21b. This increase in area is essentially localized at step 21c. The stream of water flowing through the inlet portion of the ejector and over step 21c into the larger outlet portion creates suction immediately downstream from the step; that is, at aperture 25, resulting in the pumping of liquid concentrate from the concentrate jar into the stream of water flowing into outlet portion 21a of the ejector.

Within limits, the degree of suction created by a given stream of water flowing through the ejector is proportional to the difference between the cross-sectional areas of the inlet and outlet portions of passageway 21 at step 25. The ejector shown in FIG. 12 is designed to pump liquid concentrate into the water stream at a predetermined rate of flow to provide the design spray liquid concentration of 2 gallons per jar of concentrate in the operation of the sprayer when connected to a supply of water at a given pressure. Other desired spray liquid concentration may be provided by appropriately altering the passageway dimensions of the ejector built into the unit.

In the embodiment of the sprayer illustrated in FIGS. 1–11, the control assembly 11 includes adjustable means for selecting any one of three different ratios of liquid concentrate to water as the spray solution. This chemical ratio control device comprises a rotary metering valve 28 which encircles rotary valve 16 in the sprayer assembly. Both valves 16 and 28 are independently adjustable, the chemical ratio valve also having three positions as indicated in the plan view of FIG. 11.

The chemical ratio valve 28 comprises a knurled ring 29 having a recessed indicator arrow 28a on its outer circumference to indicate the ratio setting of the valve. The valve body has a well 30 therein to receive rotary valve 16 as is best shown in FIGS. 3 and 5. Depending from the sides of the inside bore 31 of the well is a pair of bracket arms 32 which support a horizontal metering flow channel labyrinth 33. An O-ring 34 is seated in a circular groove in the upper surface of the labyrinth element 33 near its perimeter. The labyrinth element has a flow channel system with turns and constrictions designed to impress resistance to flow on streams of liquid concentrate flowing therethrough. The element has an aperture 35 therein which opens into a snout 36 upon which is connected inlet plastic tubing 37 which extends to the bottom of concentrate jar 1. The aperture 35 is the liquid concentrate inlet to the labyrinth channel 38. Commencing at aperture 35, the channel extends to its terminus at 39.

The configuration and dimensions of the channel system of the labyrinth must be calculated to provide the resistance to flow which results in the desired predetermined rate of flow of concentrate to the carrier stream of water. The dimensions are specified in detail in FIG. 7a for the example of the sprayer herein shown and described.

A thin disc 40, preferably of thin copper or other metal which is resistant to corrosion, if used, is fixed in place inside of O-ring 34 to cover the open top of the labyrinth channel, shallow lugs 41 being provided in the body of the labyrinth element to cooperate with holes 42 in disc 40 to properly locate the disc upon the labyrinth. Small orifices 43, 44 and 45 of increasing size are provided to make a metering element of disc 40.

The composite metering system, consisting of the labyrinth channel element 38 and metering disc 40 permanently affixed thereto, is arranged in abutting relationship upwardly against the flat bottom wall of the structure of rotary valve body 19 through which passageway 21 passes. These parts are urged together under the spring pressure of washer leaf spring 46 which, in turn, is retained under stress by a rigid washer 48 which is held in place by hooks 49 molded upon the ends of spring legs 47 which depend integrally from the cylindrical body 19 of rotary valve 16. Leaf spring 46 bears against the circular bottom end 13a of skirt 13 and, through spring legs 47, urges the rotary valve downwardly against the metering system. The retaining washer 48 is held against rotation by an integral lug 50 which is arranged between stop elements 14.

Radial grooves 51 (FIG. 11) are molded in the top surface of sprayer body 3 at the periphery of opening 12 to provide, in cooperation with a radial rib 52 (FIG. 3), detents for each of the three chemical ratio positions. As the knurled ring 29 is rotated to each detent position, aperture 25, opening into water passageway 21, is correspondingly aligned with one of the three orifices, 43, 44 or 45. When the aperture and the largest orifice, 45, are in alignment, the flow of liquid concentrate is direct, bypassing the labyrinth channel entirely. When so adjusted, the flow of liquid concentrate is maximum. When the aperture is in alignment with orifice 44, the liquid concentrate flows through the first section of labyrinth channel ending at take-off groove 44a, the resulting rate of flow being that effected by the resistance of the labyrinth channel and the limitations of the orifice. When aperture 25 is aligned with orifice 43, the liquid concentrate must flow the entire length of the labyrinth channel and through the smallest metering orifice 43 so that the smallest proportionate part of chemical concentrate is supplied to the water flowing through passageway 21.

It is pointed out that with correct dimensioning and flow-impeding turns and obstructions of the labyrinth channel, it is possible to selectively meter and supply predetermined quantities of the liquid concentrate without employment of the disc 40 with its metering orifices. The liquid concentrate flow is taken, through opening 25, directly from aperture 35, take-off groove 44a, or the end 39 of the labyrinth channel. When the metering disc is also employed, the necessity of close tolerances and avoidance of cross flow is less stringent. Accordingly, the preferred metering system employs the combination of the labyrinth channels and the metering orifice disc.

The structures thus far described in detail control the flow of water and proportionate quantities of liquid chemical concentrate and supply the dilute spraying solution to outlet snout 5 and thence through nozzle tube 65 to spray nozzle 10 for dispensing in a spray pattern or, if desired, a jet stream. In accordance with the invention, the spray nozzle incorporates adjustable means for forming and directing a spray pattern upwardly or downwardly or, if desired, as a jet stream.

The spray nozzle head comprises two molded plastic component parts, barrel 53 and a separate connecting element 54. The connecting unit is located within barrel 53 and serves, among other things, to secure the barrel to hub 9 which it encircles. A pair of resiliently flexible arms 55 extend rearwardly from a portion of one side of the periphery of the circular band body 56 of the connecting element, each arm terminating with a latch nib 57. A pair of apertures 58 are provided in hub 9 to receive and catch latch nibs 57, these apertures being so located that the cam element, and with it barrel 53, is necessarily properly oriented upon the sprayer hub when latched in assembled position.

The portion 56a (FIG. 10) of the rear periphery of band body 56 not occupied by arms 55 serves as a stop to engage hinge 64 to retain barrel 53 in position upon hub 9 for rotary movement only. An external shoulder 55a at the base portion of arms 55 extends rearwardly beyond the level of exposed periphery 56a of band body 56 a distance greater than the thickness of living hinge 64, this shoulder engaging the end of hub 9 leaving a gap 56b for movement of the hinge as the barrel of the nozzle is rotated.

Connecting element 54 is provided with a pair of integral, transverse web-like cams 59 and 60 as is seen in FIGS. 3, 9 and 13-15. Since the connecting element 54 is locked in a particular position upon hub 9, the cams 59 and 60 are stationary. They provide spaced, essentially horizontal cam surfaces 59a and 60a which, as will be seen, serve to control the position of a spray direction controlling baffle 61. A third cam 62 is provided on the inside of hub 9 at the location of the flat surface 63 (FIGS. 9, 10 and 16) (although this normally cylindrical surface does not need to be flat).

Baffle 61 is molded integrally with barrel 53, a living hinge 64 connecting the baffle to the barrel by a flexible connection which permits the baffle to pivot radially about the hinge. The living hinge acts as a leaf spring to continuously urge the baffle out of line with the jet stream passing through the nozzle.

The cam and baffle system of the spray nozzle is designed to locate and orient the baffle in any one of three positions. An open-ended length of tubing 65, which is force-fitted into and thus secured in, outlet snout 5, serves as a nozzle to direct a stream of dilute spray solution forwardly through the nozzle head at the axis thereof. In two positions of baffle 61, its face 66 is held at an angle crossing the axis of the nozzle so that the direction and character of the flow of the stream is altered accordingly. In the third position of the baffle, it is held in a position at one side of the jet stream issuing from tube 65.

Movement of the baffle and maintenance of its desired position is accomplished by rotation of barrel 53 of the sprayer nozzle head. When rotated as far as possible in clockwise direction (when looking into the nozzle as in FIGS. 17-19 and to the right in FIGS. 3 and 9), the baffle is drawn over the surface 60a of cam 60, forcing the baffle upwardly across the axis of the nozzle to form the spray pattern and direct it upwardly. This position is illustrated in FIG. 17. When the nozzle barrel is rotated 90 degrees in the counterclockwise direction, the baffle is in the position indicated in FIG. 18 and has no appreciable influence upon the stream of solution from tube 65. The baffle lies between cams 59 and 60 neither of which is operative in this jet stream position. Further rotation of 90 degrees in the counterclockwise direction brings cam 59 into operation to tilt the baffle downwardly across the stream to form the spray and direct it downwardly from the nozzle as shown in FIG. 19.

The limits of clockwise and counterclockwise movement of barrel 53 are determined by engagement of the rearward portion 61a of baffle 61 with one of the external side edges 55b of arms 55 which serve as stops to position the baffle as desired.

The face 66 of the baffle is curved inwardly as indicated in FIGS. 3 and 9 to provide the desired characteristics of the spray pattern.

Cam 62 on the inner surface of hub 9, if used, operates against the inner end of baffle 61, rearwardly of hinge 64, to ensure the withdrawal of the face of the baffle from the line of flow of the stream from tube 65. While this is the normal position of the baffle, when left in stressed position under the influence of either cam 59 or 60 for a long period of time, the plastic material tends to take a permanent bend. The positive action of cam 62 tends to overcome this condition.

ACHIEVEMENT

The sprayers of the invention provide great versatility to meet the needs of a wide variety of spraying operation. The water supply may not only be turned off or on at the sprayer, but may be directed into the jar as needed to replenish the chemical concentrate. In the adjustable spray liquid concentration model, any three different proportions of concentrate may be selected and supplied to provide the desired concentration of chemical to be applied by the sprayer.

In a simpler sprayer, any one of the three concentrations, or any other single predetermined concentration of spray liquid, may be provided by proper dimensioning of the passageway of the ejector. The ejector, itself, is novel in that it can be molded with a single core, accuracy of proportioning pumping being assured by the complete absence of parting line impediments to flow in the ejector passageway.

We claim:

1. In a hose-end sprayer comprising a chemical concentrate jar and a top closure having flow control means and a horizontal outlet snout therein and a spray nozzle supported thereby and connected through said snout with said flow control means for the flow of spray solution to said nozzle, the improvements comprising an open ended nozzle tube extending forwardly into said spray nozzle from said snout as an extension thereof, a hollow cylindrical hub extending forwardly from said snout, the inside diameter of said hub being greater than the outside diameter of said tube, a barrel mounted for rotation upon said hub, an elongated baffle longitudinally arranged within said barrel sidewise of said tube extended and hingedly secured to said barrel at a point intermediate the ends of said baffle, spring means for continuously urging said baffle out of line with said tube, upper and lower transverse cams secured within said barrel forwardly of the location at which said baffle is hingedly secured, said cams having substantially horizontal working faces defining chords of said barrel out of line with said tube, the arrangement being such that at one rotational position of said barrel said upper cam holds the forward portion of said baffle downwardly across the axis of said nozzle tube and at the opposite rotational position of said barrel said lower cam holds said forward portion of said baffle upwardly across the axis of said tube.

2. Structure in accordance with claim 1 wherein said sprayer barrel and said baffle are composed of a plastic material and said baffle is hingedly secured to said barrel by a living hinge.

3. Structure in accordance with claim 1 or 2 and including a separate connecting element arranged within the forward portion of said barrel, said element having a circular band body and a pair of adjacent resiliently flexible arms in the form of rearward extensions of a portion of one side of the periphery of said body, the ends of said arms and said hub having nibs and apertures respectively cooperating to secure said element to said hub, said upper and lower cams being formed integrally with said element within said band body.

4. Structure in accordance with claim 1 or 2 and including a separate connecting element arranged within the forward portion of said barrel, said element having a circular band body and a pair of adjacent resiliently flexible arms in the form of rearward extensions of a portion of one side of the periphery of said body, the ends of said arms and said hub having nibs and apertures respectively cooperating to secure said element to said hub, said upper and lower cams being formed integrally with said element within said band body, the distance of the exposed rear periphery of said band body not occupied by said arms to said nibs being such that said exposed rear periphery engages the structure hingedly securing said baffle to said barrel to retain said barrel in position upon said hub for rotary movement only.

5. Structure in accordance with claim 1 or 2 and including a separate connecting element arranged within the forward portion of said barrel, said element having a circular band body and a pair of adjacent resiliently flexible arms in the form of rearward extensions of a portion of one side of the periphery of said body, the ends of said arms and said hub having nibs and apertures respectively cooperating to secure said element to said hub, said upper and lower cams being formed integrally with said element within said band body, the distance of the exposed rear periphery of said band body not occupied by said arms to said nibs being such that said exposed rear periphery engages the structure hingedly securing said baffle to said barrel to retain said barrel in position upon said hub for rotary movement only, the base portion of said arms having an external shoulder extending rearwardly beyond the level of said exposed rear periphery of said band body a distancce greater than the thickness of said structure hingedly securing said baffle to said barrel, said shoulder engaging the periphery of said hub leaving a gap between said hub and said band body for movement of said hinge securement structure.

6. Structure in accordance with claim 1 or 2 and including a separate connecting element arranged within the forward portion of said barrel, said element having a circular band body and a pair of adjacent resiliently flexible arms in the form of rearward extensions of a portion of one side of the periphery of said body, the ends of said arms and said hub having nibs and apertures respectively cooperating to secure said element to said hub, said upper and lower cams being formed integrally with said element within said band body, the distance of the exposed rear periphery of said band body not occupied by said arms to said nibs being such that said exposed rear periphery engages the structure hingedly securing said baffle to said barrel to retain said barrel in position upon said hub for rotary movement only, the base portion of said arms having an external sholder extending rearwardly beyond the level of said exposed rear periphery of said band body a distance greater than the thickness of said structure hingedly securing said baffle to said barrel, said shoulder engaging the periphery of said hub leaving a gap between said hub and said band body for movement of said hinge securement structure, the external sides of said pair of adjacent arms being so located that when engaged by the rearward portion of said baffle the forward portion of said baffle is in full engagement with one of said transverse cams.

7. Structure in accordance with claim 1 or 2 wherein a third cam is provided to project inwardly from a side surface of the inside of said hub for engagement by the rearward portion of said baffle whereby rotation of said barrel to an intermediate position positively withdraws the forward portion of said baffle out of line with said nozzle tube.

8. Structure in accordance with claim 1 or 2 wherein the forward end portion of said baffle is curved inwardly to spread the stream of water when impinging thereon to form a spread spray pattern.

* * * * *